US008166493B2

(12) United States Patent  
Ichikawa et al.

(10) Patent No.: US 8,166,493 B2  
(45) Date of Patent: Apr. 24, 2012

(54) MEDIA PROCESSING DEVICE INCLUDING HOST COMPUTER CAPABLE OF MEASURING THE HEIGHT OF BLANK MEDIA

(75) Inventors: Mahito Ichikawa, Matsumoto (JP); Kazuya Toshima, Ueda (JP); Keisuke Tsunoda, Toumi (JP)

(73) Assignee: Seiko Epson Corporation, Tokyo (JP)

( * ) Notice: Subject to any disclaimer, the term of this patent is extended or adjusted under 35 U.S.C. 154(b) by 490 days.

(21) Appl. No.: 11/973,046

(22) Filed: Oct. 4, 2007

(65) Prior Publication Data

US 2008/0109117 A1    May 8, 2008

(30) Foreign Application Priority Data

Oct. 4, 2006    (JP) ................................. 2006-272394

(51) Int. Cl.  
*G11B 17/04*    (2006.01)

(52) U.S. Cl. ..... 720/619; 700/214; 700/227; 369/30.85; 358/1.15

(58) Field of Classification Search .................. 720/600, 720/619; 369/30.28–30.37, 30.85; 700/213, 700/214, 217, 218, 228, 229  
See application file for complete search history.

(56) References Cited

U.S. PATENT DOCUMENTS

| | | | |
|---|---|---|---|
| 5,078,378 A * | 1/1992 | Kapadia et al. | 271/3.04 |
| 5,518,230 A * | 5/1996 | Scarlata et al. | 271/186 |
| 5,640,535 A * | 6/1997 | Suzuki et al. | 711/170 |
| 5,790,779 A * | 8/1998 | Ben-Natan et al. | 714/39 |
| 5,841,743 A * | 11/1998 | Kobayashi et al. | 369/30.3 |
| 5,946,541 A * | 8/1999 | Kakigi | 399/405 |
| 6,222,800 B1 * | 4/2001 | Miller et al. | 369/30.19 |
| 6,275,195 B1 * | 8/2001 | Gyenes | 343/745 |
| 6,384,929 B1 * | 5/2002 | Miller | 358/1.15 |
| 6,400,659 B1 * | 6/2002 | Kitaoka | 369/34.01 |
| 6,490,232 B2 | 12/2002 | Sato | |
| 7,717,534 B2 * | 5/2010 | Inaba et al. | 347/19 |
| 7,882,272 B2 * | 2/2011 | Ichikawa et al. | 710/5 |
| 8,074,235 B2 * | 12/2011 | Kawakami | 720/619 |
| 2005/0157605 A1 * | 7/2005 | Lilland et al. | 369/30.36 |
| 2006/0087070 A1 * | 4/2006 | Cook et al. | 271/145 |
| 2008/0122878 A1 * | 5/2008 | Keefe et al. | 346/19 |
| 2008/0320504 A1 * | 12/2008 | Oshida | 720/601 |

(Continued)

FOREIGN PATENT DOCUMENTS

JP    06-111379    4/1994

(Continued)

OTHER PUBLICATIONS

Office Action for .U.S. Appl. No. 11/906,654 dated Apr. 2, 2010.

(Continued)

*Primary Examiner* — Tan X Dinh  
(74) *Attorney, Agent, or Firm* — Nutter McClennen & Fish LLP; John J. Penny, Jr.; Rory P. Pheiffer

(57) ABSTRACT

The media storage status of a target medium stacker is reported to the user through a host computer. In response to a height measurement command for measuring the height of blank media stacked in a blank media stacker and processed media stacked in a processed media stacker, a height measurement step measures the height of blank media and processed media based on operation of the media transportation arm, and a measurement transmission step sends the measurement acquired in the height measurement step to the host computer in response to a measurement transmission request from the host computer.

9 Claims, 12 Drawing Sheets

U.S. PATENT DOCUMENTS

| | | | |
|---|---|---|---|
| 2009/0073821 A1* | 3/2009 | Toshima | 369/34.01 |
| 2009/0296540 A1* | 12/2009 | Gilbert et al. | 369/30.23 |
| 2010/0072689 A1* | 3/2010 | Toshima et al. | 271/3.14 |
| 2010/0079799 A1* | 4/2010 | Toshima et al. | 358/1.15 |

FOREIGN PATENT DOCUMENTS

| | | |
|---|---|---|
| JP | 06-135103 | 5/1994 |
| JP | 07-186462 | 7/1995 |
| JP | 2000-260172 | 9/2000 |
| JP | 2001-023345 A | 1/2001 |
| JP | 2002-279359 | 9/2002 |
| JP | 2005-259230 A | 9/2005 |
| JP | 2005-259318 | 9/2005 |

OTHER PUBLICATIONS

Office Action for .U.S. Appl. No. 11/906,654 dated Oct. 6, 2009.

* cited by examiner

MEDIA PROCESSING DEVICE INCLUDING HOST COMPUTER CAPABLE OF MEASURING THE HEIGHT OF BLANK MEDIA

Priority is claimed under 35 U.S.C. §119 to Japanese Patent Application No. 2006-272394 filed Oct. 4, 2006, which is hereby incorporated by reference in its entirety.

TECHNICAL FIELD

The present invention relates to a media processing device and a control method for a media processing device that writes data to one side of a target medium such as CD and DVD discs and prints on the other side of the medium.

BACKGROUND TECHNOLOGY

Media processing devices for recording data to media to which data is not recorded ("blank media" below) are known from the literature. Such media processing devices generally have at least one media drive for recording data to the media, a verification device for verifying if the media was correctly recorded, a printer for printing on the label surface bonded to the back side of the media recording surface, stackers for storing the media, and a transportation device for carrying the media between these other processing stations. See, for example, Japanese Unexamined Patent Appl. Pub. JP-A-2000-260172.

The media processing device taught in JP-A-2000-260172 has three different stackers, a blank media stacker, a passed media stacker, and a defective media stacker. The blank media stacker stores media to which data has not been recorded, the passed media stacker stores passed media that the verification device determines was correctly recorded, and the defective media stacker stores defective media that the verification device determines was not correctly recorded.

The storage capacity of each of the stackers in this media processing device is fixed, and if this storage capacity is exceeded the normal media publishing process cannot continue. More specifically, if the passed media stacker is filled to capacity with passed media, any newly produced passed media cannot be stored in the passed media stacker, and processing cannot continue. On the other hand, if there are no blank media in the blank media stacker, media cannot be produced according to the media production commands.

SUMMARY OF THE INVENTION

The present invention reports the media storage status of each stacker to the user by means of a host computer.

A media processing device according to a first aspect of at least one embodiment of the invention has a media drive that applies a data writing process to one side of a target medium; a printer that applies a printing process to the other side of the target medium; a target media stacker that stores the target medium in a stack; a media transportation mechanism control unit that controls a media transportation mechanism to transport the target medium to any one of the media drive, the printer, and the target media stacker; and a measurement control unit that instructs the media transportation mechanism control unit to execute a height measurement operation according to a height measurement command for moving the media transportation mechanism and measuring the height of the target media at the destination, and measures the height of the target media based on media transportation mechanism operation. The measurement control unit moves the media transportation mechanism to the top of the target media and then measures the height of one or more target media based on at least one transportation mechanism movement command and height measurement command received between a start process command and end process command received from a host computer.

Another aspect of at least one embodiment of the invention is a control method for a media processing device that has a media drive that applies a data writing process to one side of a target medium, a printer that applies a printing process to the other side of the target medium, a target media stacker that stores the target medium in a stack, and a media transportation mechanism control unit that controls a media transportation mechanism to transport the target medium to any one of the media drives, the printer, and the target media stacker, the control method having the following steps measuring the height of the target media based on media transportation mechanism operation according to a height measurement command for moving the media transportation mechanism and measuring the height of the target media at the destination; and moving the media transportation mechanism to the top of the target media and then measuring the height of one or more target media based on at least one transportation mechanism movement command and height measurement command received between a start process command and end process command received from a host computer.

By measuring the height of a stack of target media based on the operation of the media transportation mechanism that moves the target media and sending the measurement to the host computer, this aspect of the invention can report the media storage status of the target media stacker to the user by means of the host computer. The user can thus know the target media storage status from the measurement.

In a media processing device according to another aspect of at least one embodiment of the invention, the target media stacker includes a blank media stacker for storing blank media to which the data writing process and the printing process have not been applied, and a processed media stacker for storing processed media after the data writing process and the printing process have been applied.

In a media processing device control method according to this aspect of the invention, the target media stacker includes a blank media stacker for storing blank media to which the data writing process and the printing process have not been applied, and a processed media stacker for storing processed media after the data writing process and the printing process have been applied, and the height measurement step measures the height of blank media stacked in the blank media stacker, and measures the height of processed media stacked in the processed media stacker.

This aspect of the invention enables measuring the height of blank media stacked in the blank media stacker, measuring the height of processed media stacked in the processed media stacker, and sending the measurements to the host computer. The user can then take appropriate action based on the measurements, such as replenishing the supply of blank media before the blank media stacker becomes empty, or removing processed media before the processed media stacker is filled to capacity with processed media.

In a media processing device according to another aspect of at least one embodiment of the invention, the measurement control unit determines if the height measurement command executed normally; and the transmission control unit sends an error report to the host computer if the measurement control unit determines the height measurement command did not execute normally.

The media processing device control method according to another aspect of at least one embodiment of the invention includes the following steps determining if the height measurement command executed normally; and sending an error report to the host computer if the determining step determines the height measurement command did not execute normally.

This aspect of the invention sends an error report to the host computer if it is determined that the height measurement command could not be executed normally, and the user can thus know from the host computer that the target media height measurement process did not execute normally. The cause of the error can then be determined and steps taken to execute the height measurement command again.

Other objects and attainments together with a fuller understanding of the invention will become apparent and appreciated by referring to the following description and claims taken in conjunction with the accompanying drawings.

DESCRIPTION OF THE PREFERRED EMBODIMENTS

A first embodiment of a media processing device according to the present invention is described below with reference to the accompanying figures.

Figure 1:
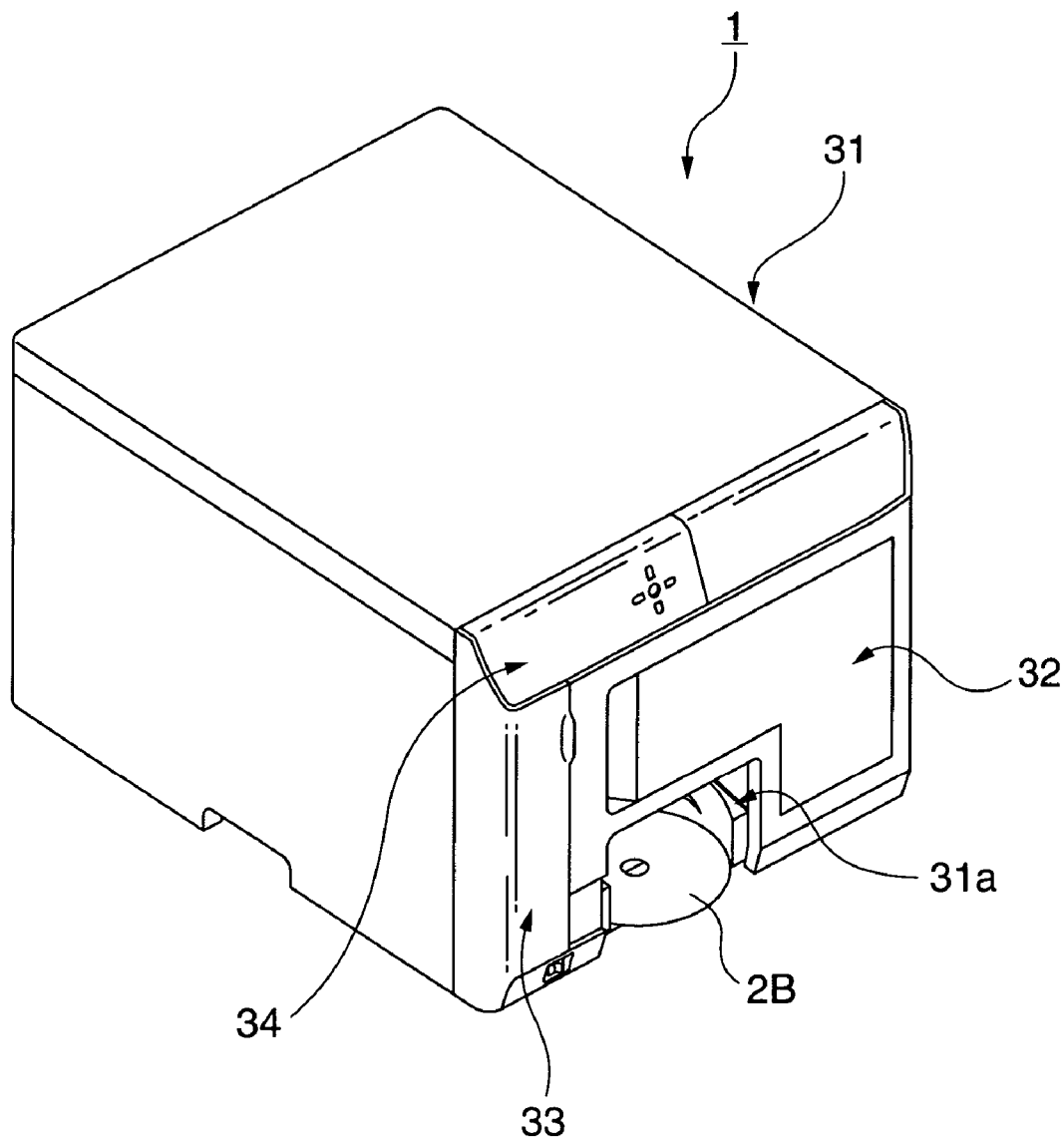
FIG. 1 is an oblique view of a media processing device according to a first embodiment of the invention.
Figure 2:
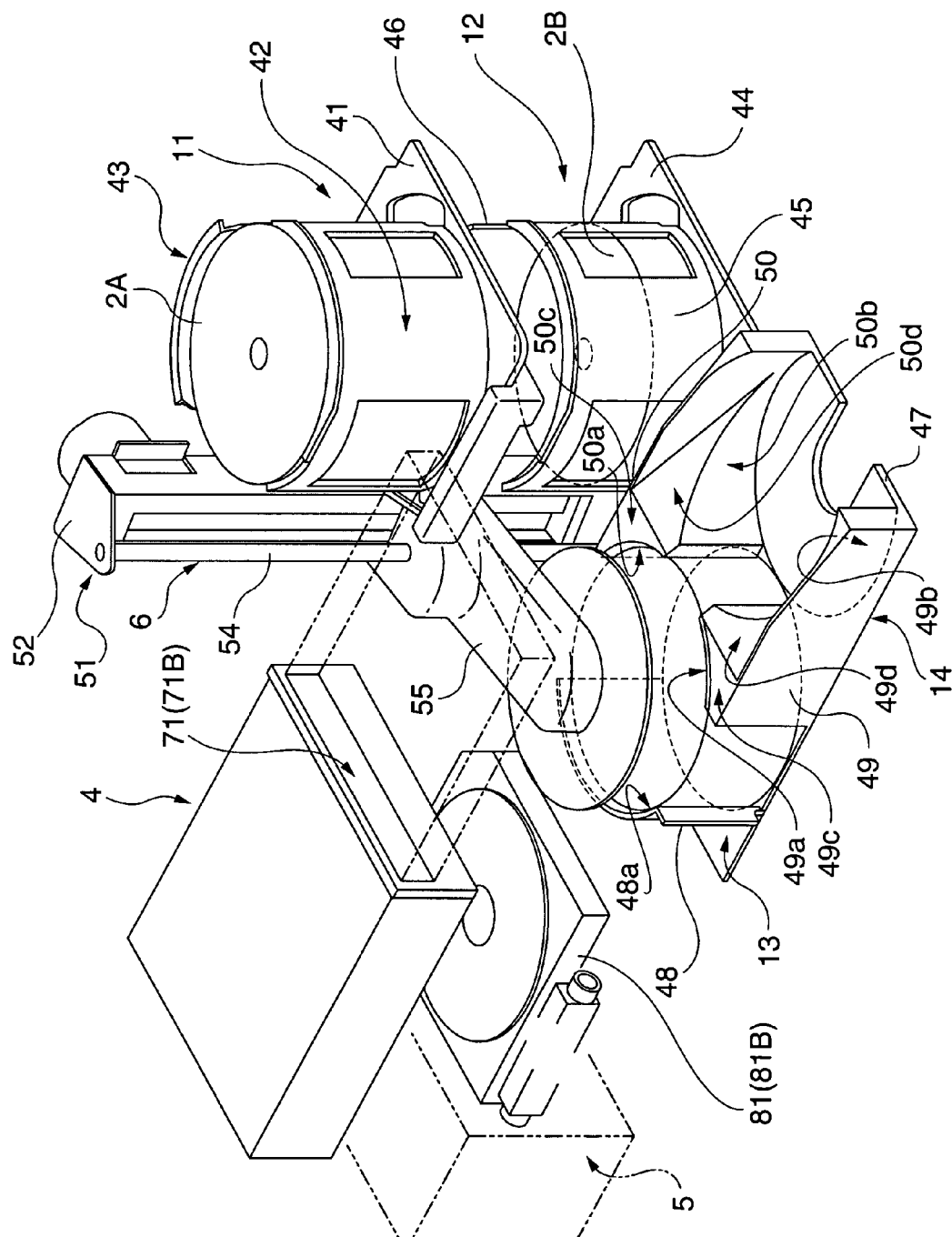
FIG. 2 is an oblique view showing the main internal parts of the media processing device shown in FIG. 1.
Figure 3:
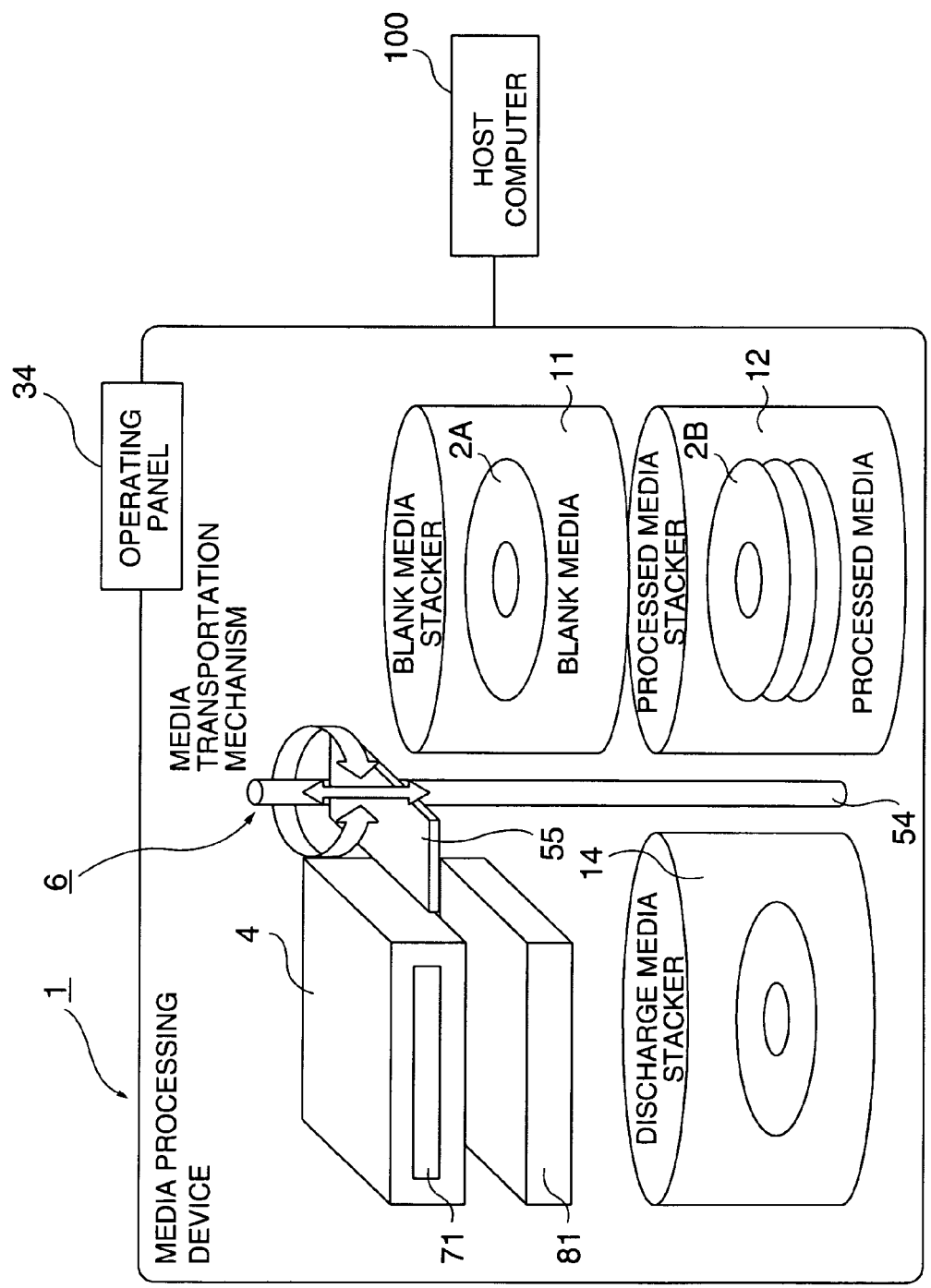
FIG. 3 is a schematic view of the mechanical arrangement of the media processing device shown in FIG. 1.

FIG. 1 is an oblique external view of a media processing device 1, FIG. 2 is an oblique view showing the main internal parts of the media processing device 1, and FIG. 3 is a schematic view showing the mechanical arrangement of the media processing device 1.

Arrangement of the Media Processing Device

As shown in FIG. 1, the media processing device 1 has a basically box-shaped case 31 with doors 32 and 33 that can open and close to the right and left disposed at the front of the case 31. An operating panel 34 having operating buttons, a power button, a keypad, and a fingerprint reader, for example, is disposed above the doors 32 and 33. A rectangular media exit 31a that is open to the outside for removing processed media is disposed below the one operable door 32 with the long side of the media exit 31a horizontal.

As shown in FIG. 2, a blank media stacker 11 (blank media storage means) and a processed media stacker 12 (target media storage means) are disposed substantially coaxially one above the other inside the case 31 of the media processing device 1 on the right side as seen from the front. The blank media stacker 11 stores blank media (also referred to as "discs" below) 2A that have not passed through the data writing process and label printing process. The processed media stacker 12 stores processed media 2B after the data writing process and label printing process have been applied.

The blank media stacker 11 has a slide tray 41 that can be pulled horizontally out to the front, and a pair of left and right curved side walls 42 and 43 disposed vertically on top of the slide tray 41, thus rendering a stacker that receives discs from the top opening and holds the discs stacked coaxially. The task of storing or replenishing media to be processed (referred to below as target media) in the blank media stacker 11 can be done easily by opening the operable door 32 and pulling the slide tray 41 out to the front.

The processed media stacker 12 below the blank media stacker 11 is identically constructed, and has a slide tray 44 that can be pulled horizontally out to the front, and a pair of left and right curved side walls 45 and 46 disposed vertically on top of the slide tray 44, thus rendering a stacker that receives processed media 2B from the top opening and holds the discs stacked coaxially.

The blank media stacker 11 and the processed media stacker 12 can each hold 50 (=n) discs in this embodiment of the invention.

A general purpose stacker 13 is disposed behind and to the left of the blank media stacker 11 and processed media stacker 12. The general purpose stacker 13 can be used to store media that is rejected because the data writing process failed or to store processed discs 2B. (In this case the general purpose stacker 13 serves the role of a target medium storage means.) A discharge media stacker 14 that is used for discharging the processed discs 2B to the outside is located in front of the general purpose stacker 13. These stackers 13 and 14 have a common base 47 and side walls 48, 49, and 50 rising vertically from the base 47.

The rear general purpose stacker 13 is composed of the curved inside circumference surface 48a of the rear side wall 48, and the curved inside circumference surfaces 49a and 50a on the back side of the left and right side walls 49 and 50, and stores the processed discs 2B received from the top opening formed by these side walls stacked coaxially.

The front discharge media stacker 14 is composed of the curved inside circumference surfaces 49b and 50b on the front side of the left and right side walls 49 and 50, and stores the processed disc 2B received from the top opening formed by these side walls stacked coaxially.

The top surfaces 49c and 50c of the left and right side walls 49 and 50 are substantially triangular flat surfaces, and sloped guide surfaces 49d and 50d that slope to the front are formed contiguously to the front edges of the top surfaces 49c and 50c. These sloped guide surfaces 49d and 50d continue to the top edge part of the left and right inside circumference surfaces 49b and 50b of the discharge media stacker 14.

In this embodiment of the invention, the general purpose stacker 13 can hold 30 (=n1) target discs, and the discharge media stacker 14 can hold 20 (=n2) target discs.

Target media (discs) means media that are processed by the processes executed by the media processing device 1, and include both blank media (discs) 2A and processed media (discs) 2B.

As shown in FIG. 2 and FIG. 3, a media transportation mechanism 6 is disposed behind the blank media stacker 11 and processed media stacker 12. The media transportation mechanism 6 includes a chassis 51 that is attached vertically to the case 31, a vertical guide shaft 54 that rises vertically between the top and bottom horizontal support plates 52 and 53 (not shown) of the chassis 51, and a media transportation arm 55 that is attached to this vertical guide shaft 54. The media transportation arm 55 can travel up and down on the vertical guide shaft 54, and can pivot right and left around the vertical guide shaft 54.

A media drive 4 (data writing means) is located at the top and a label printer 5 (printing means) is located at the bottom behind the media transportation mechanism 6. In FIG. 2, the media tray 71 of the top media drive 4 is shown in the retracted position 71B inside the media drive 4, and the printer tray 81 of the bottom label printer 5 is shown in the rear media printing position 81B. The label printer 5 can be inkjet printer that uses ink cartridges (not shown in the figure) of various colors as the ink supply source, and the ink cartridges are installed to a cartridge housing (not shown in the figure).

The internal processes of the media processing device 1 are described next.

Figure 4:
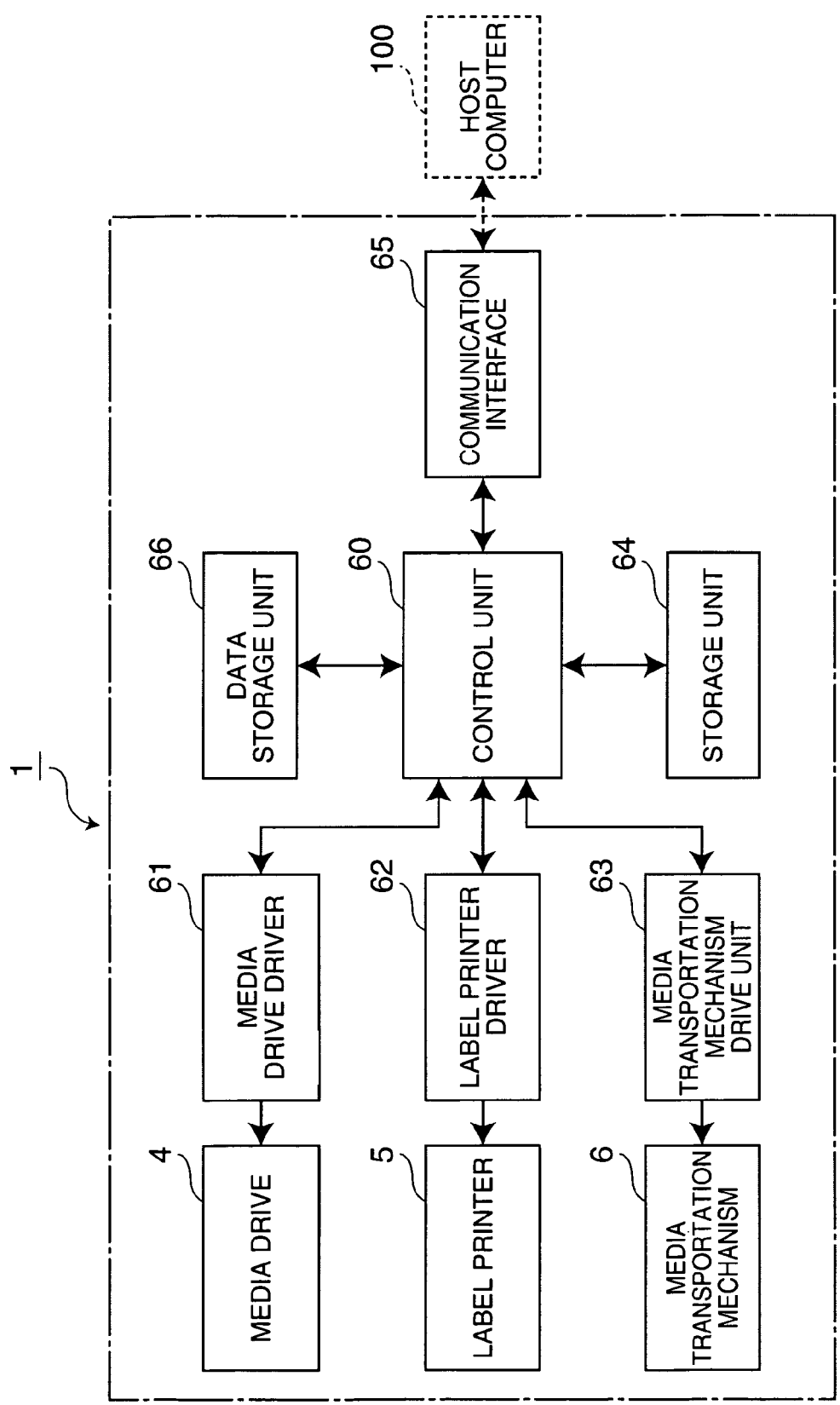
FIG. 4 is block diagram of the media processing device shown in FIG. 1.

FIG. 4 is a block diagram showing the internal arrangement of the media processing device 1. As shown in the figure, the media processing device 1 has a control unit 60 (measurement control unit) that controls the other parts, and controls the media drive driver 61, the label printer driver 62, and the media transportation mechanism drive unit 63 (media transportation mechanism control unit) that are also inside the media processing device 1.

The media drive driver 61 controls driving the media drive 4. The label printer driver 62 controls driving the label printer 5. The media transportation mechanism drive unit 63 controls driving the media transportation mechanism 6.

The media processing device 1 also has storage unit 64 that temporarily stores data to be written to the CD and image data for printing a label on the label side of the CD, and a communication interface 65. The control unit 60 is connected to the host computer 100 by the communication interface 65 over a dedicated line or a public communication line.

The control unit 60 usually controls the media production process (including data writing operation and label printing operation) based on commands supplied form the host computer 100. The host computer 100 supplies a plurality of commands bracketed by a preceding start process command and a following end process command. The control unit 60 can batch process these plural commands, executes the commands sequentially from the first command, and returns a response to the host computer 100 when executing all commands ends normally. If any one of the commands could not be executed normally, the control unit 60 immediately returns a response indicating the command that produced an error to the host computer 100, and interrupts processing all of the remaining commands. The host computer 100 interprets the process result based on the response from the control unit 60 of the media processing device 1. If there is a command that could not be processed normally, the host computer 100 displays the presumed cause of the failure based on the reported command error on the monitor (not shown in the figure) of the host computer 100.

The control unit 60 instructs the media transportation mechanism drive unit 63 to operate for measuring the stacked media height in response to a height measurement command that is sent from the host computer 100 to measure the height of blank media 2A stacked in the blank media stacker 11 or the height of processed media 2B stacked in the processed media stacker 12. Based on the operating distance of the media transportation mechanism that is returned by the media transportation mechanism drive unit 63, the control unit 60 then measures the height of the stack of blank discs 2A or processed discs 2B.

The control unit 60 then calculates how far the media transportation arm 55 moved according to the movement command that specifies the destination of the arm. More specifically, the control unit 60 calculates the number of revolutions of the elevator motor and the pivot motor (not shown in the figure) connected to the media transportation arm 55, and causes the media transportation mechanism drive unit 63 to move the media transportation arm 55 to the specified destination.

When the media transportation arm 55 moves to the blank media stacker 11, the processed media stacker 12, or the general purpose stacker 13, the media transportation mechanism drive unit 63 drives the elevator motor according to the height measurement command, lowers the media transportation arm 55, and measures the height of the stacked target media 2 from the number of steps (operating amount) that the elevator motor is driven until the media transportation arm 55 contacts the target media 2 stacked in the appropriate stacker.

The data storage unit 66 stores firmware for driving the media drive 4, the label printer 5, and the media transportation mechanism 6, and the control unit 60 outputs commands to the appropriate drive units as controlled by the firmware when command input from the host computer 100 is detected. The data storage unit 66 also stores a data table relating the number of steps driven by the elevator motor to the measured height of the target media 2, and the control unit 60 retrieves the stack height by referencing this data table. The acquired height measurement is therefore stored in a predefined area in the data storage unit 66.

FIG. 4 shows the media drive 4, the label printer 5, and the media transportation mechanism 6 all being managed by a single control unit 60, but it will be obvious that a separate control unit and interface can be provided for each of these units.

The target media height measurement process that is run by the media processing device 1 is described next.

Figure 5:
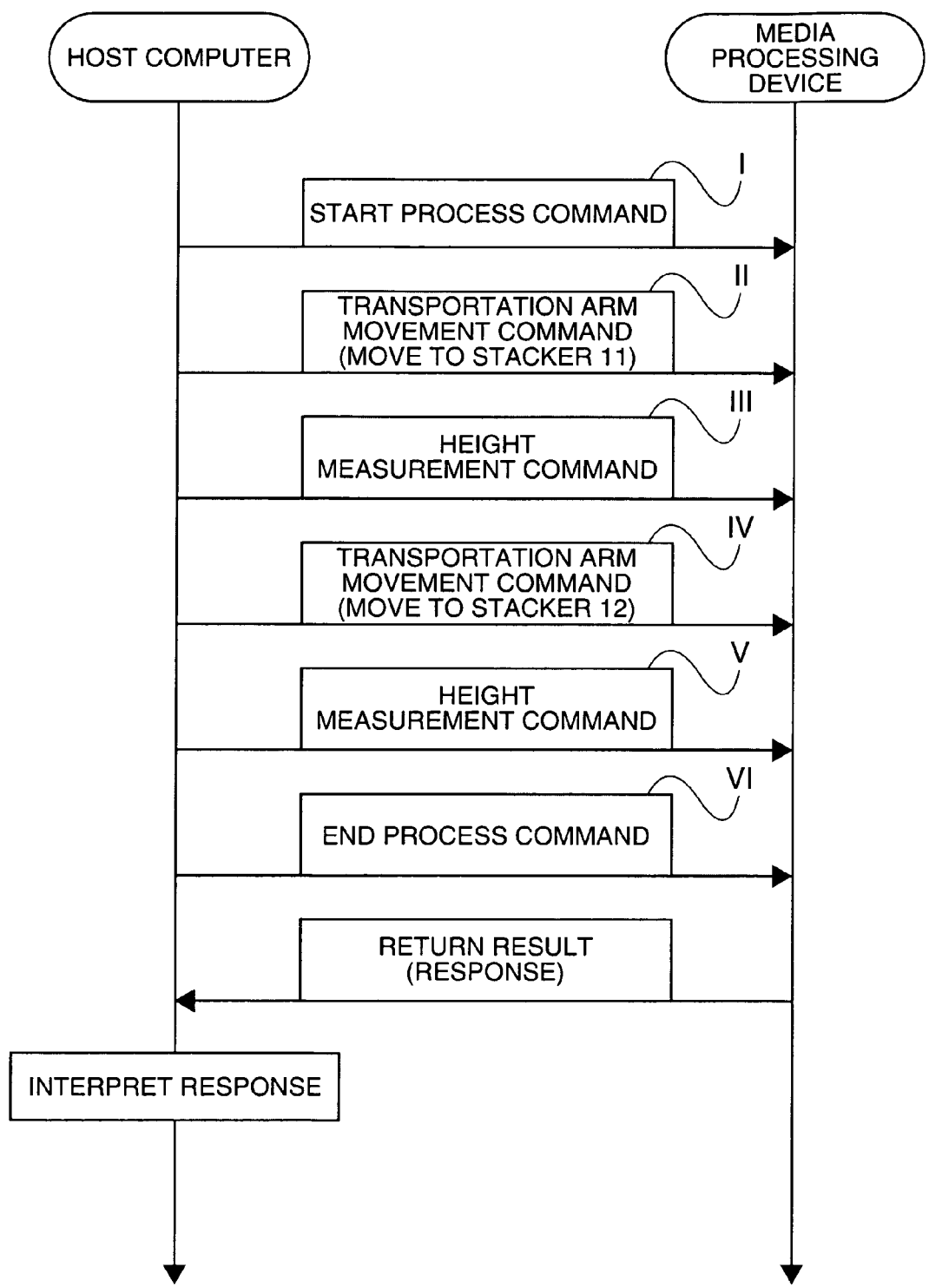
FIG. 5 is a flow chart describing data communication between the host computer and the media processing device shown in FIG. 1.

FIG. 5 is a timing chart describing data communication with the host computer 100.

The command set II to V in a series bracketed by a start process command I and end process command VI are, for example, a command (command II) for moving the media transportation arm 55 to the blank media stacker 11, a command (command III) for lowering the media transportation arm 55 at the blank media stacker 11 to measure the height of the blank media 2A, a command (command IV) for moving the media transportation arm 55 to the processed media stacker 12, and a command (command V) for lowering the media transportation arm 55 at the processed media stacker 12 to measure the height of the processed media 2B. The control unit 60 sequentially executes the commands when this command set is received from the host computer 100. This process is described in the flow chart in FIG. 6.

Figure 6:
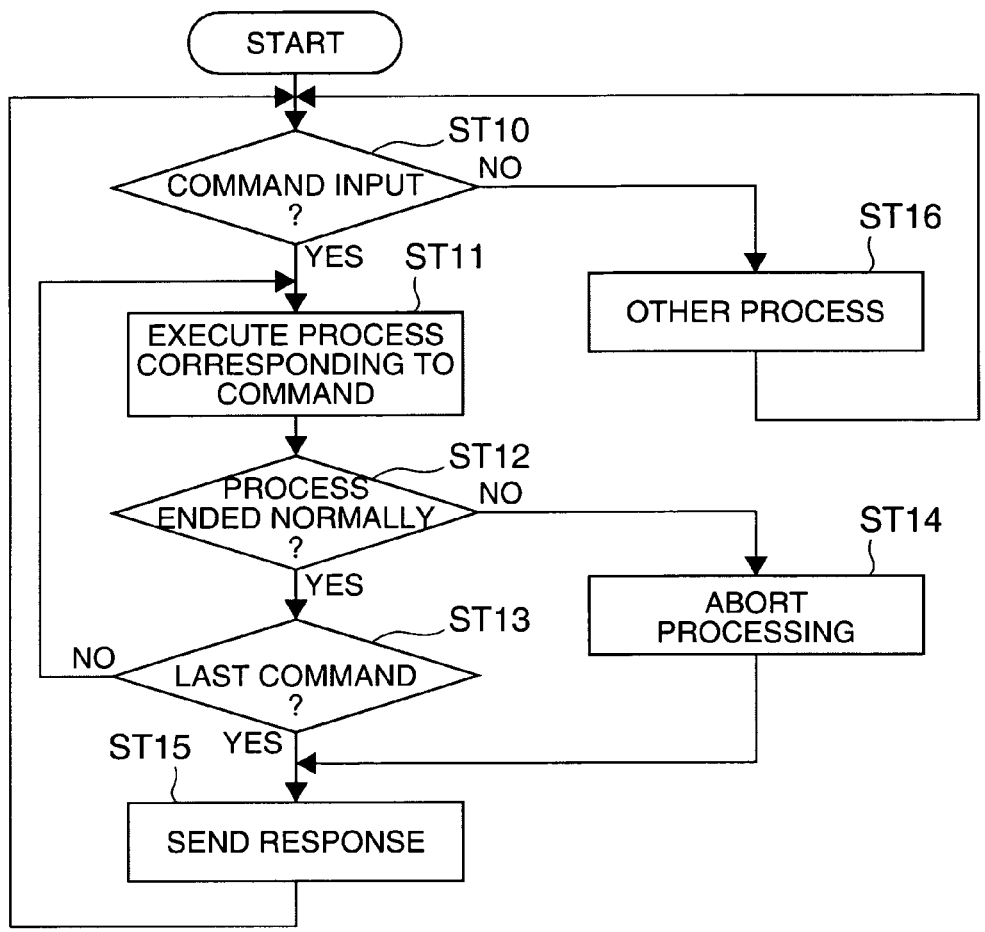
FIG. 6 is a flow chart describing the operation of the media processing device shown in FIG. 1.

Referring to FIG. 6, the control unit 60 first determines if a command was input from the host computer 100 (step ST10). If a command was not input from the host computer 100 (step ST10 returns No), a different process is executed (step ST16) and control returns to step ST10.

If a command was input from the host computer 100 (step ST10 returns Yes), the control unit 60 instructs the appropriate unit to execute the process corresponding to the command (step ST11). For example, in the case of command II for moving the media transportation arm 55 to the blank media stacker 11, an instruction for executing the process corresponding to command II is applied to the media transportation mechanism drive unit 63. When the media transportation mechanism drive unit 63 receives this instruction, it drives the elevator motor and pivot motor of the media transportation arm 55 to move the arm to the blank media stacker 11. When movement of the media transportation arm 55 is completed, information denoting completion of the action is sent from the media transportation mechanism drive unit 63 to the control unit 60.

After instructing the media transportation mechanism drive unit 63 to execute the process corresponding to command II, the control unit 60 determines if the process of command II was executed normally (step ST12). If the process executed normally (step ST12 returns Yes), whether the current command is the last command in the command set is determined in order to execute the process corresponding to the next command. If the current command is not the last command, the procedure returns to step ST11 and the process corresponding to the next command is executed.

This loop repeats until the processes corresponding to all of the commands have executed normally, and a response is then returned (step ST15, reporting the result of the process in FIG. 5). The response in this case tells the host computer 100 that the processes corresponding to all of the commands executed normally.

If the detected command is command III (that is, a command for lowering the media transportation arm 55 at the blank media stacker 11 to measure the height of the blank media 2A), an instruction for executing the process corresponding to command III is applied to the media transportation mechanism drive unit 63. When the media transportation mechanism drive unit 63 receives this command, it lowers the media transportation arm 55 to the blank media 2A on the blank media stacker 11 and the control unit 60 measures the height of the blank media 2A. When the control unit 60 calculates the measurement, it stores the result in the data storage unit 66 as the height of the blank media 2A stacked in the blank media stacker 11.

If the detected command is command IV (that is, a command to move the media transportation arm 55 to the processed media stacker 12), an instruction for executing the process corresponding to command IV is applied to the media transportation mechanism drive unit 63. When the media transportation mechanism drive unit 63 receives this command, it moves the media transportation arm 55 to the processed media stacker 12. When moving the media transportation arm 55 is completed, information denoting completion of the action is sent from the media transportation mechanism drive unit 63 to the control unit 60.

If the detected command is command V (that is, a command for lowering the media transportation arm 55 at the processed media stacker 12 to measure the height of the processed media 2B), the control unit 60 applies an instruction for executing the process corresponding to command V to the media drive driver 61. When the media transportation mechanism drive unit 63 receives this command, it lowers the media transportation arm 55 to the processed media 2B on the processed media stacker 12 and the control unit 60 measures the height of the processed media 2B. When the control unit 60 calculates the measurement, it stores the result in the data storage unit 66 as the height of the processed media 2B in the processed media stacker 12.

If step ST12 determines that the process did not execute normally (step ST12 returns No), processing is aborted (step ST14) and the command response is returned to the host computer 100 (step ST15). Aborting the process in this case means that processing all remaining commands is also aborted. For example, if the process corresponding to command III did not execute normally (the height measurement command could not be executed normally), the processes for command IV and command V are aborted. Aborting execution of the processes corresponding to all remaining commands when one process produces an error avoids running meaningless processes. Furthermore, by sending a response for the aborted command through the communication interface 65 to the host computer 100, the host computer 100 can know what command was aborted and can quickly identify where there is a failure in the media processing device 1.

Situations in which the height measurement command cannot be executed normally include the situations in which any one of the blank media stacker 11, the processed media stacker 12, the general purpose stacker 13, and the discharge media stacker 14 is not installed, if the doors 32 and 33 are open, the media transportation arm 55 is positioned where the blank media 2A or processed media 2B height cannot be measured, the media transportation arm 55 or the media tray 81 is operating, and the media transportation arm 55 had picked up a target disc 2 when the control unit 60 determines in step ST10 that a height measurement command was input.

Normal operation is not possible in the following situations: any one of the stackers 11, 12, 13, or 14 is not installed; safety cannot be assured when the media transportation arm 55 is moved when the doors 32 and 33 are open; the media transportation arm 55 cannot measure the height because it is positioned where the height cannot be measured; the media transportation arm 55 is already in use by another application even though it is required to measure the height; and the media tray 81 is operating. To avoid such problems, the height measurement command is therefore not executed in such situations and an error is returned to the host computer 100.

Figure 7:
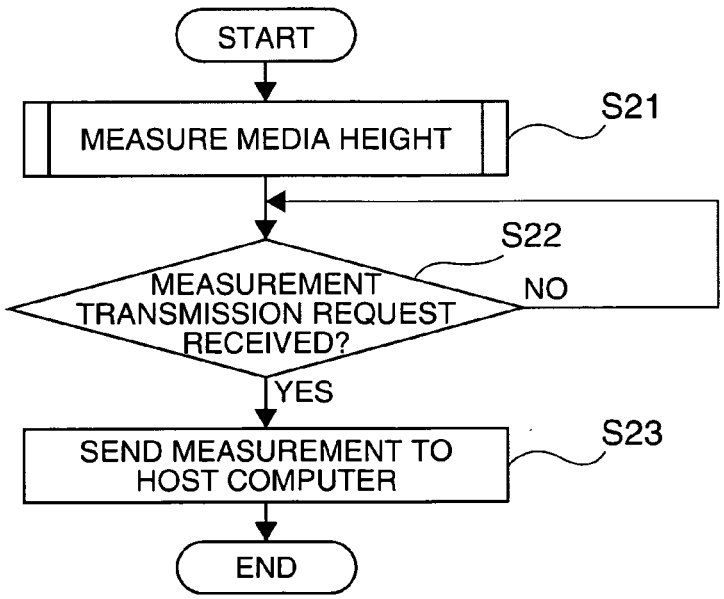
FIG. 7 is a flow chart describing the measurement transmission process executed by the media processing device shown in FIG. 1.

The measurement transmission process for sending the height measurement to the host computer 100 is described next. FIG. 7 is a flow chart describing the height measurement transmission process executed by the media processing device.

When measuring the height of the blank media 2A and processed media 2B is completed (step ST21) and a height measurement transmission request is received from the host computer 100 (step ST22 returns Yes), the control unit 60 reads the height measurement stored in the data storage unit 66 and sends the height measurement through the communication interface 65 to the host computer 100 (step ST23). The control unit 60 in this case functions as a transmission control unit.

The height measurement transmission request can be a request for only the height measurement of the blank media 2A, a request for only the height measurement of the processed media 2B, or a request for both the height measurement of the blank media 2A and the height measurement of the processed media 2B at the same time.

Because the media processing device 1 according to this embodiment of the invention sends an error report to the host computer 100 (step ST15) if it is determined in step ST12 in FIG. 6 that the height measurement command could not be executed normally, the user can know through the host computer 100 that the process of measuring the height of the blank media 2A or the processed media 2B did not execute normally. Why the process was aborted can therefore be determined so that the height measurement command can be executed again.

The media processing device 1 according to this embodiment of the invention can thus measure the height of the blank media 2A stacked in the blank media stacker 11 and the height of the processed media 2B stacked in the processed media stacker 12, and can send the measurements to the host computer 100. The host computer 100 can then calculate how many discs are in each stacker based on these height measurements. The user can then take appropriate action based on the number of discs calculated from the measurements, such as adding more blank discs 2A before the blank media stacker 11 becomes empty or removing processed discs 2B before the processed media stacker 12 is filled with processed media 2B.

The foregoing embodiment of the invention produces a CD, DVD, or similar medium by way of example, but the invention can also be used to produce various types of external recording media, including optical discs such as CDs and DVDS, magneto-optical discs, semiconductor memory, and magnetic recording media. The external recording medium writing device (media drive) can obviously be a device that writes and produces only one type of external recording media, or a device that can write and produce different types of external recording media.

Figure 8:
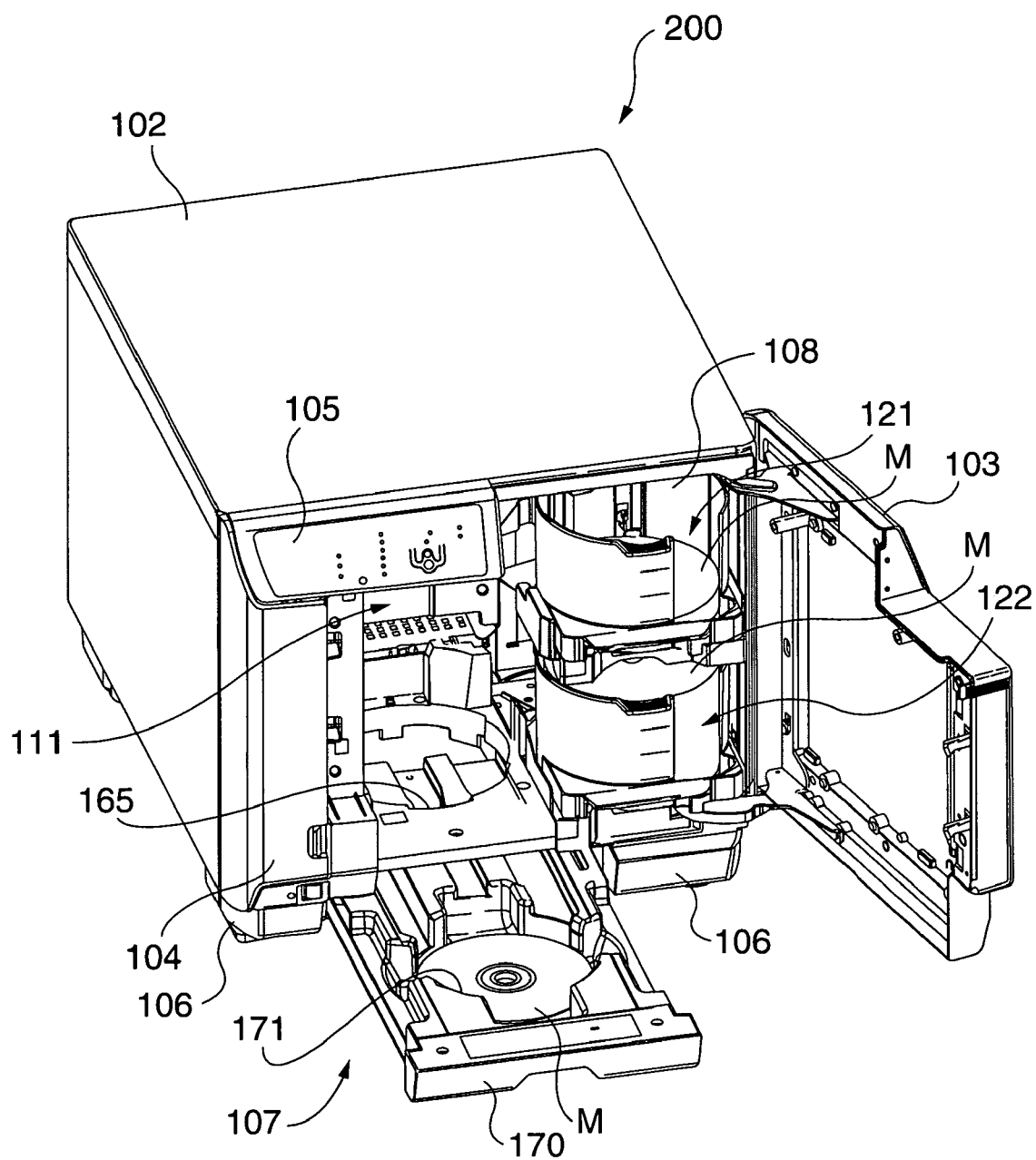
FIG. 8 is an oblique view showing selected parts of a media processing device according to a second embodiment of the invention when the access doors are open.
Figure 9:
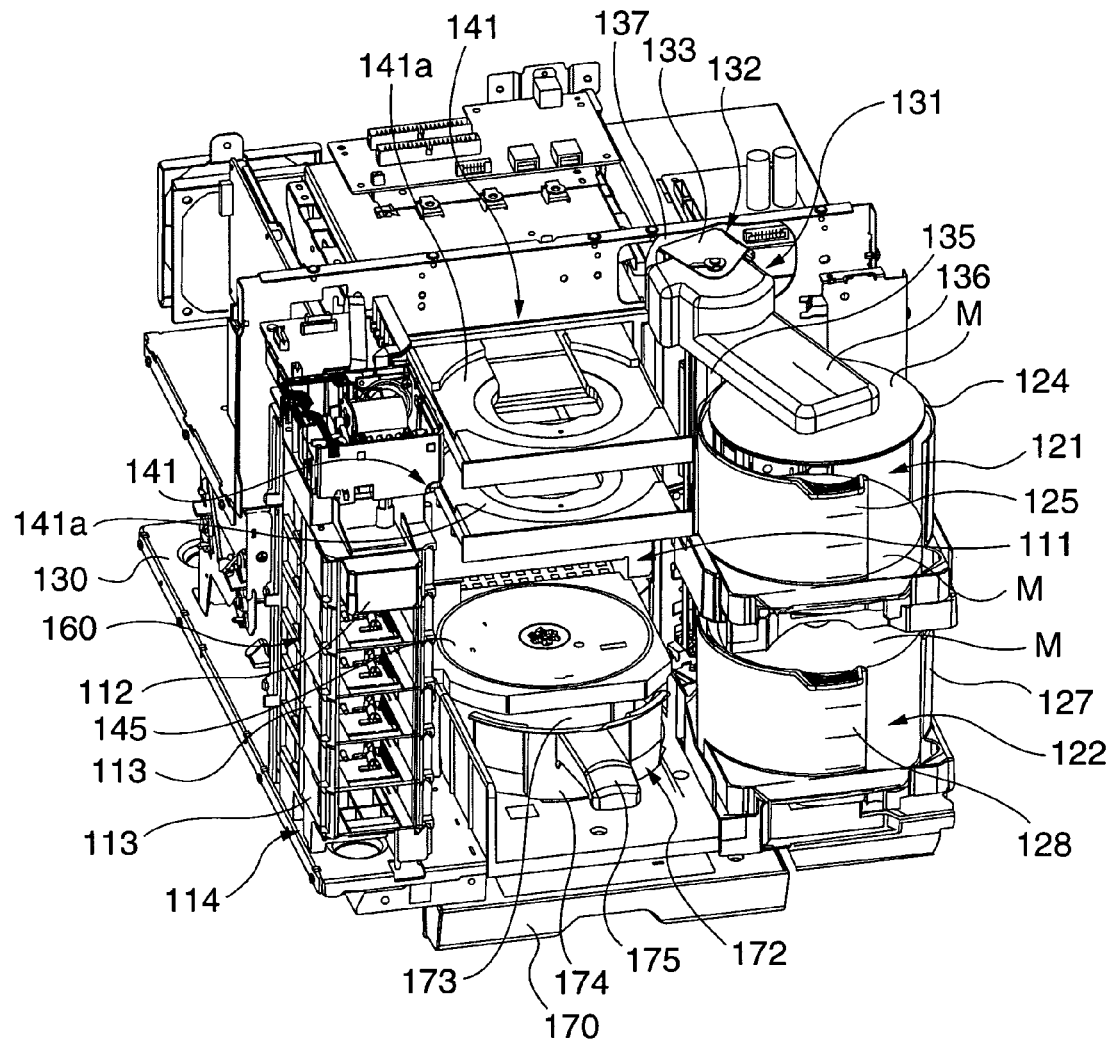
FIG. 9 is an oblique view showing the main internal parts of the media processing device according to a second embodiment of the invention.
Figure 10:
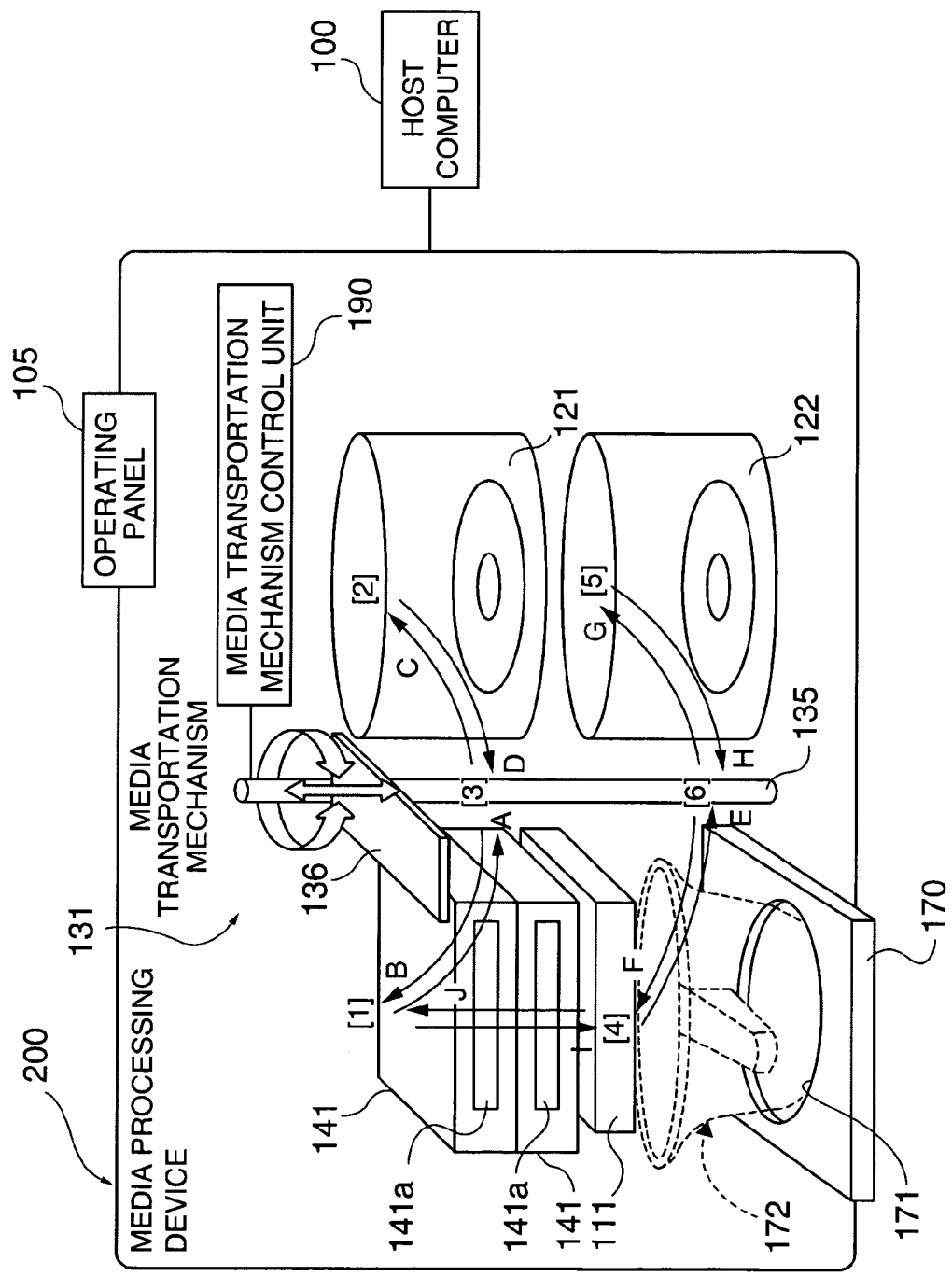
FIG. 10 describes the mechanical arrangement of a media processing device according to the second embodiment of the invention.

A second embodiment of a media processing device according to the present invention is described next with reference to FIGS. 8-11. FIG. 8 is an oblique view showing the appearance of the media processing device according to this embodiment of the invention when the front doors are open, FIG. 9 is an oblique view of the major internal parts of the media processing device, and FIG. 10 is a schematic block diagram showing the mechanical arrangement of the media processing device.

Arrangement of the CD Publisher

As shown in FIG. 8, this media processing device 200 is a media processing device for writing data to disc-shaped media such as CD and DVD media (referred to as simply "discs" below) and printing on the label side of the discs, and has a basically box-shaped case 102. Right and left doors 103 and 104 that can open and close are disposed at the front of the case 102. An operating panel 105 having indicators and operating buttons, for example, is disposed at the top left part of the case 102, and support legs 106 projecting downward are disposed on the left and right sides at the bottom of the case 102. A drawer mechanism 107 is disposed between the left and right legs 106.

The operable door 103 on the right side as seen from the front opens and closes the opening 108 at the front of the media processing device 200 as shown in FIG. 8, and is used for opening and closing the opening 108 in order to load unused (blank) media M through the opening 108 or to remove finished media M through the opening 108.

The other operable door 104 on the left side as seen from the front is opened and closed to replace the ink cartridges 112 (see FIG. 9) of the label printer 111 shown in FIG. 8. Opening the operable door 104 exposes the cartridge carrier 114, which has a plurality of cartridge holders 113 arranged vertically (see FIG. 9).

A (top) first media stacker 121 (media storage unit) and a (bottom) second media stacker 122 (media storage unit) are disposed one above the other inside the case 102 of the media processing device 200 so that the centers of the media M are substantially coaxially aligned. The first media stacker 121 stores a plurality (such as 50) of blank media M (also referred to as "discs" below) that have not passed through the data writing process. The second media stacker 122 stores a plurality (such as 50) of unused media M or processed media M. Both the first media stacker 121 and the second media stacker 122 can be freely installed to and removed from a respectively prescribed position.

As shown in FIG. 9, the top first media stacker 121 has a pair of right and left curved side walls 124 and 125 disposed so that the media M can be received from the top opening and stored in a coaxial stack. Storing or replenishing media M in the first media stacker 121 can be done easily by opening the operable door 103 and pulling the first media stacker 121 out.

As shown in FIG. 9, the bottom second media stacker 122 is constructed the same way having a pair of right and left curved side walls 127 and 128, rendering a stacker that can receive the media M from the top opening and store the media M in a coaxial stack.

A media transportation mechanism 131 is disposed behind the first media stacker 121 and the second media stacker 122. The media transportation mechanism 131 has a vertical guide shaft 135 that extends vertically between the main frame 130 and the top plate 133 of the chassis 132. A transportation arm 136 is supported so that it can move vertically and pivot on this vertical guide shaft 135. A drive motor 137 enables the transportation arm 136 to move vertically along the vertical guide shaft 135 and to pivot right and left around the vertical guide shaft 135.

Two media drives 141 are stacked vertically to the side of and behind the top and bottom stackers 121 and 122 and the media transportation mechanism 131, and the carriage (not shown in the figure) of the label printer 111 is disposed movably below these media drives 141.

Each of the media drives 141 has a media tray 141a that can move between a position for writing data to the media M and a media transfer position for loading and unloading the media M.

Why two media drives 141 are provided is described next. Writing data to the data surface of CD or DVD media is time consuming (requiring up to approximately five minutes), and total throughput can be increased by writing two discs simultaneously.

The label printer 111 has a media tray 145 that can move between a printing position for printing a label on the label side of the media M, and a media transfer position for loading and unloading the media M.

FIG. 9 shows the media trays 141a of the top and bottom media drives 141 pulled out to the media transfer position, and the media tray 145 of the label printer 111 below the media drives 141 in the forward media transfer position.

The label printer 111 can be inkjet printer that uses ink cartridges 112 as the ink supply mechanism 160. This embodiment of the invention uses ink cartridges 112 in six different colors (black, cyan, magenta, yellow, light cyan, and light magenta). The ink cartridges 112 are loaded from the front into the cartridge holders 113 of the cartridge carrier 114.

A gap enabling the media transportation arm 136 of the media transportation mechanism 131 to ascend and descend is formed between the left and right side walls 124 and 125 of the first media stacker 121, and between the left and right side walls 127 and 128 of the second media stacker 122. A gap is also formed between the top first media stacker 121 and bottom second media stacker 122 so that the media transportation arm 136 of the media transportation mechanism 131 can pivot horizontally for positioning directly above the second media stacker 122. When both media trays 141a are retracted into the media drives 141, the transportation arm 136 of the media transportation mechanism 131 can descend to access the media tray 145 in the media transfer position.

When both media trays 141a are positioned to the data writing position and the media tray 145 is positioned to the inside printing position, the transportation arm 136 of the media transportation mechanism 131 can descend below the height of the media tray 145. A guide hole 165 is formed below the media transfer position of the media tray 145 so that media M released when the transportation arm 136 descends to this position pass through the guide hole 165. Another media stacker (a separate stacker) described below is disposed to this guide hole 165.

The drawer mechanism 107 (see FIG. 8) has a sliding tray 170 that can be pulled out from the main frame 130 to an open position and closed and stored below the main frame 130. A stacker unit 171 in the form of an open recess is disposed in the sliding tray 170. When the sliding tray 170 is in the storage position (closed position), the stacker unit 171 is positioned below the guide hole 165, and the center of the stacker unit 171 is positioned substantially coaxially to the media trays 141a and media tray 145 in the media transfer position. The stacker unit 171 receives media M deposited through the guide hole 165, and stores only a relatively small number (such as 5 to 10) of discs M. The stacker unit 171 receives the media M from the top and stores the media M stacked coaxially.

A third media stacker 172 (a separate stacker) with a larger media M storage capacity than the stacker unit 171 can be installed to and removed from the guide hole 165 when the stacker unit 171 of the sliding tray 170 is in the storage position.

This third media stacker 172 also has a pair of curved side walls 173 and 174, receives media M from the top opening between the walls, and can store a plurality of (such as 50) media M stacked coaxially. A gap enabling the media transportation arm 136 of the media transportation mechanism 131 to ascend and descend is formed between the curved side walls 173 and 174. A handle 175 that is held by the user during installation and removal is disposed on a top part of one side wall 174.

When the third media stacker 172 is installed as shown in FIG. 9 and FIG. 10, the media M can be stored in the third media stacker 172 after blank media M are removed from the lower second media stacker 122 and recorded and printed by one of the media drives 141 and the label printer 111.

Furthermore, the first media stacker 121 and the second media stacker 122 can both be loaded with media M to the maximum storage capacity (e.g., 50 discs+50 discs), all media M (e.g., 50 discs) in the bottom second media stacker 122 can be sequentially processed and stored in the third media stacker 172, and then all media M (e.g., 50 discs) in the first media stacker 121 can be sequentially processed and stored in the emptied second media stacker 122. Media m equal to the maximum storage capacity of the first media stacker 121 and the second media stacker 122 (e.g., 50 discs+ 50 discs) can therefore be processed in one operation (batch processing mode).

In addition, when the third media stacker 172 is removed, blank media M can be taken from the first media stacker 121 or the second media stacker 122, data can be recorded and a label can be printed by the media drives 141 and label printer 111, and the processed media M can then be stored in the stacker unit 171 of the sliding tray 170 in the storage position.

Media M for which processing has been completed can thus be removed from the stacker unit 171 by pulling the sliding tray 170 out. More specifically, completed media M can be removed one or multiple discs at a time while the media M are processed and the operable door 103 remains closed (external discharge mode).

By combining the vertical travel and right and left pivoting actions of the transportation arm 136 of the media transportation mechanism 131, the media M can be desirably transported to the first media stacker 121, the second media stacker 122, the stacker unit 171 of the sliding tray 170 (or the third media stacker 172), the media tray 141a of each of the media drives 141, and the media tray 145 of the label printer 111.

The internal processes of the media processing device 200 are described next.

Figure 11:
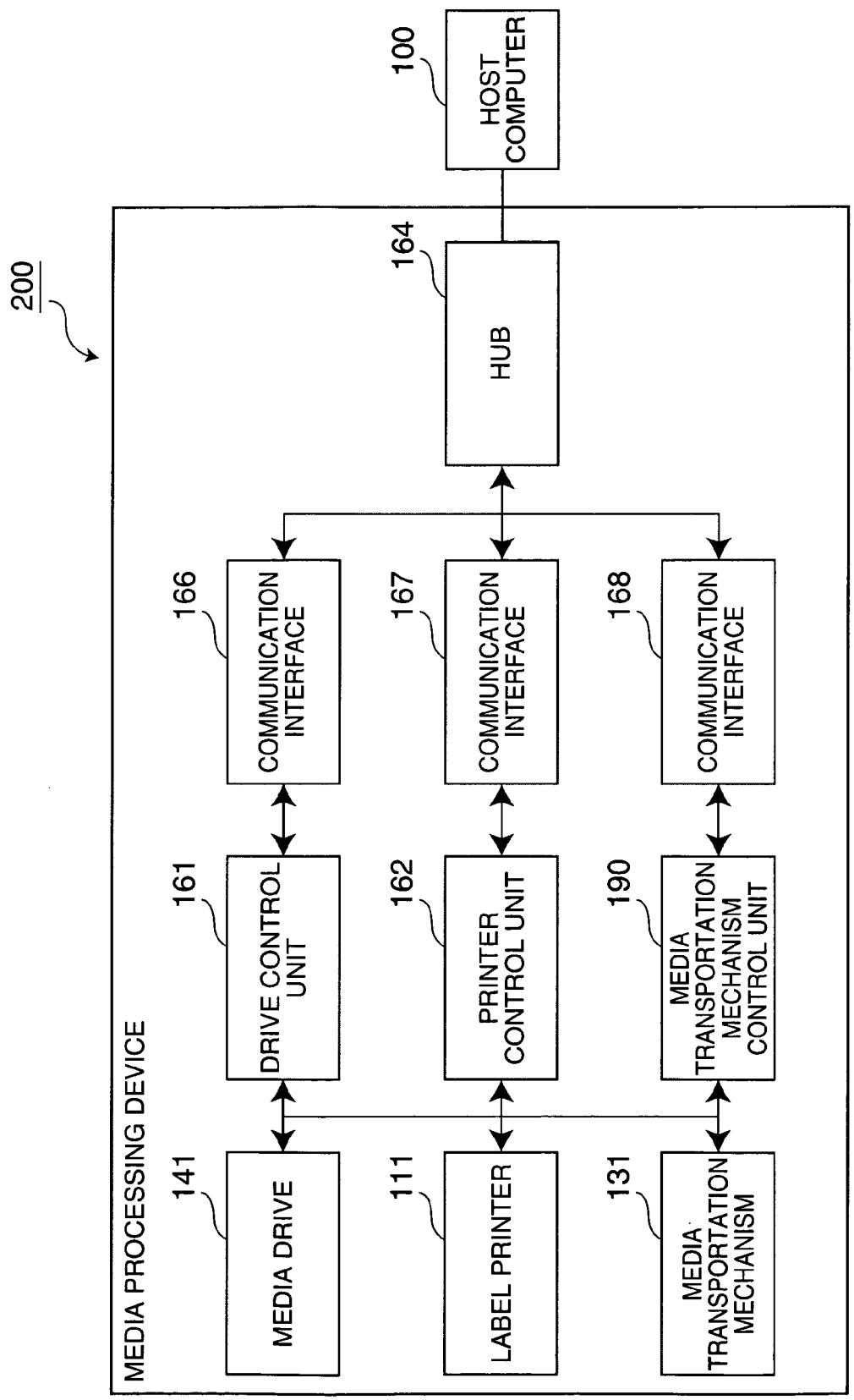
FIG. 11 is a block diagram describing the arrangement of the internal processes of the media processing device according to the second embodiment of the invention.

FIG. 11 is a block diagram showing the internal arrangement of the media processing device 200.

In this embodiment of the invention, three USB devices, a label printer 111, a media drive 141, and a media transportation mechanism 131, are communicably connected through a hub 164 for connecting multiple USB devices to a USB port of the host computer 100.

The USB devices and the host computer 100 are communicably connected through communication interfaces 166, 167, and 168.

The drive control unit 161 controls driving the media drive 141. The printer control unit 162 controls driving the label printer 111. The media transportation mechanism control unit 190 controls driving the media transportation mechanism 131.

The drive control unit 161 also has storage unit for temporarily storing data to be written to the CD, and the printer control unit 162 has a storage unit for temporarily storing image data for printing a label on the label side of the CD.

The media processing device 200 controls the media production process (including data writing operation and label printing operation) based on commands supplied form the host computer 100. The host computer 100 supplies a plurality of commands bracketed by a preceding start process command and a following end process command. The control units 161, 162, and 163 can batch process these plural commands, execute the commands sequentially from the first command, and return a response to the host computer 100 when executing all commands ends normally. If any one of the commands could not be executed normally, the control unit immediately returns a response indicating the command that produced an error to the host computer 100, and interrupts processing all of the remaining commands. The host computer 100 interprets the process result based on the response from the control units 161, 162, and 163 of the media processing device 200. If there is a command that could not be processed normally, the host computer 100 displays the presumed cause of the failure based on the reported command error on the monitor (not shown in the figure) of the host computer 100.

(1) Detecting the Media Height in the First Media Stacker 121

The transportation arm 136 is moved vertically between the pair of right and left side walls 124 and 125 of the first media stacker 121 to measure the height of the media stack.

(2) Detecting the Media Height in the Second Media Stacker 122

The transportation arm 136 is moved vertically between the pair of right and left side walls 127 and 128 of the second media stacker 122 to measure the height of the media stack.

(3) Detecting the Media Height in the Third Media Stacker 172

The transportation arm 136 is moved vertically between the pair of curved side walls 173 and 174 of the third media stacker 172 to measure the height of the media stack. The media trays 141a and 145 must be retracted inside at this time.
(4) Detecting the Media Height in the Fourth Media Stacker (Stacker Unit 171)

Because the transportation arm 136 will not reach the stacker unit 171 even when the transportation arm 136 is completely lowered in this embodiment of the invention, the height of media on the sliding tray 170 (stacker unit 171) cannot be detected. A media-full detector is therefore disposed to the stacker unit 171 so that the height of the media does not exceed a specific level.

(5) Detecting the Media Height in the Media Tray 141a of the Media Drive 141

The height of media stacked on the media tray 141a cannot be directly detected by lowering the transportation arm 136 to the media on the media tray 141a because of relatively large deviations in the size of the media tray and warping of the media tray. A media sensor that detects if a disc is present or not is therefore disposed to the media drive 141 so that whether zero discs or one or more discs are loaded can be known when the media tray 141a is retracted into the media drive 141.

When a disc is not on the media tray 141a and the media tray 141a is ejected from the media drive 141, a disc is carried from the first media stacker 121, for example, to the media tray 141a. By using the transportation arm 136 to compare the height of the first media stacker 121 before and after a disc is removed, the height of the media, that is, whether there is only one disc or whether there are multiple discs on the media tray 141a can be detected.

This same method can be used if the media are brought from the second media stacker 122 to the media tray 141a.

(6) Detecting the Height of Media on the Media Tray 145 of the Label Printer 111

Because the deviation between media trays 145 is small, the media height (count) can be measured by directly lowering the transportation arm 136 to the media tray 145. When the transportation arm 136 is holding a disc, it releases the disc after contacting the media tray 145. The transportation arm then rises slightly to a height at which a height measurement sensor attached to the transportation arm 136 can operate. The transportation arm 136 then descends to contact the media tray 145 again to determine if plural media are on the media tray.

Methods (5) and (6) above check whether the number of discs on the tray is one (normal) or two or more (error). If a disc loading error is detected, the error is reported to the host or a warning is signaled by the media processing device to inform the user.

As in the first embodiment of the invention, this second embodiment measures the height of the media on the first to third media stackers based on the height measurement command sent from the host, and stores the result as the media height in the data storage unit 66.

When an inquiry about the media height in the first to third stackers is received from the host, both the first and second embodiments send the value of the media height stored in the data storage unit 66 to the host.

After the media height has been measured based on the media height measurement command, the media height stored in the data storage unit 66 is updated even if a media height measurement command is not received by (A) subtracting 1 when a disc is picked from one stacker, and (B) adding 1 when the disc is released onto another stacker.

The media detection mechanism is described next.

Figure 12:
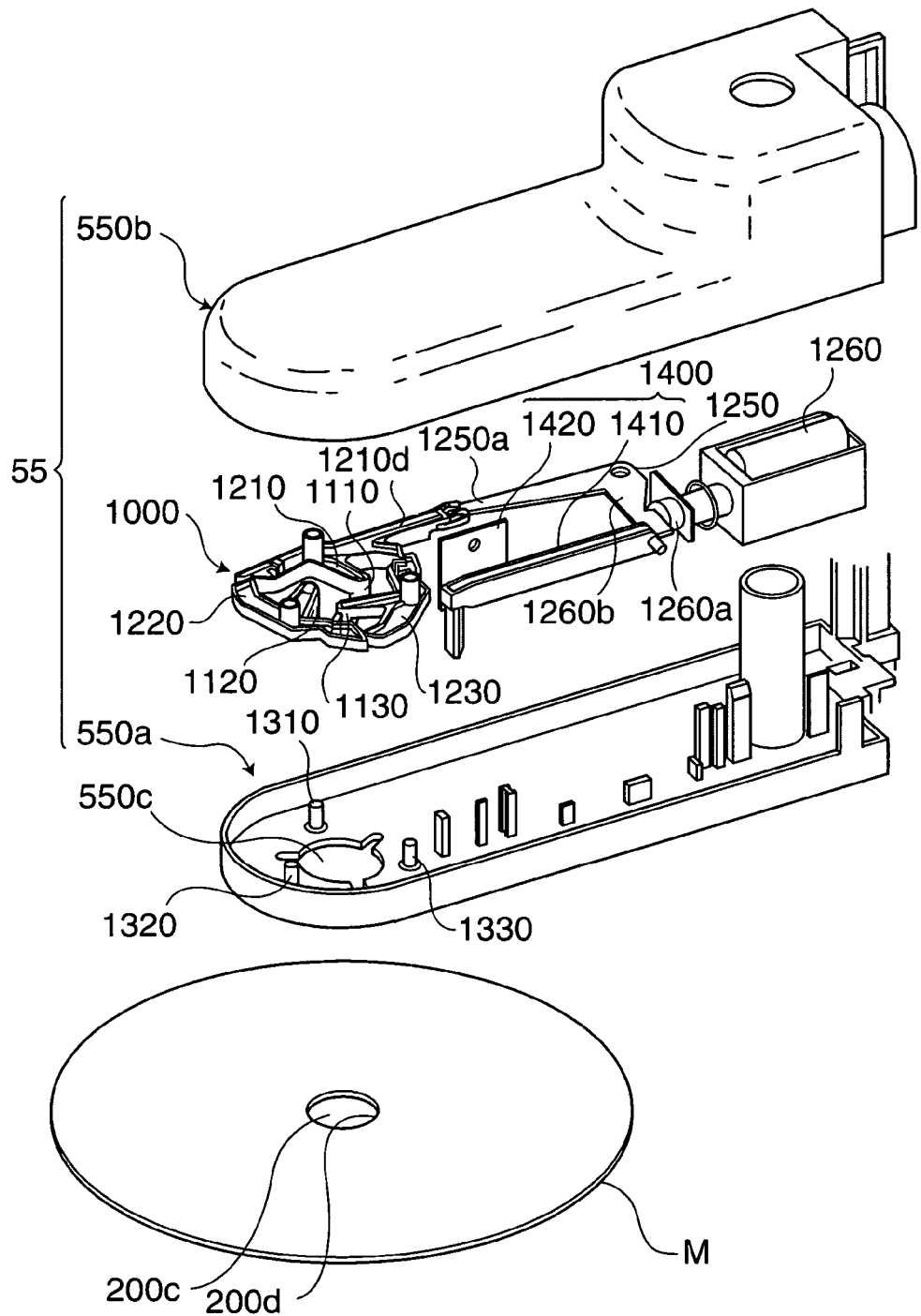
FIG. 12 is an exploded oblique view of the transportation arm of the media transportation unit.
Figure 13:
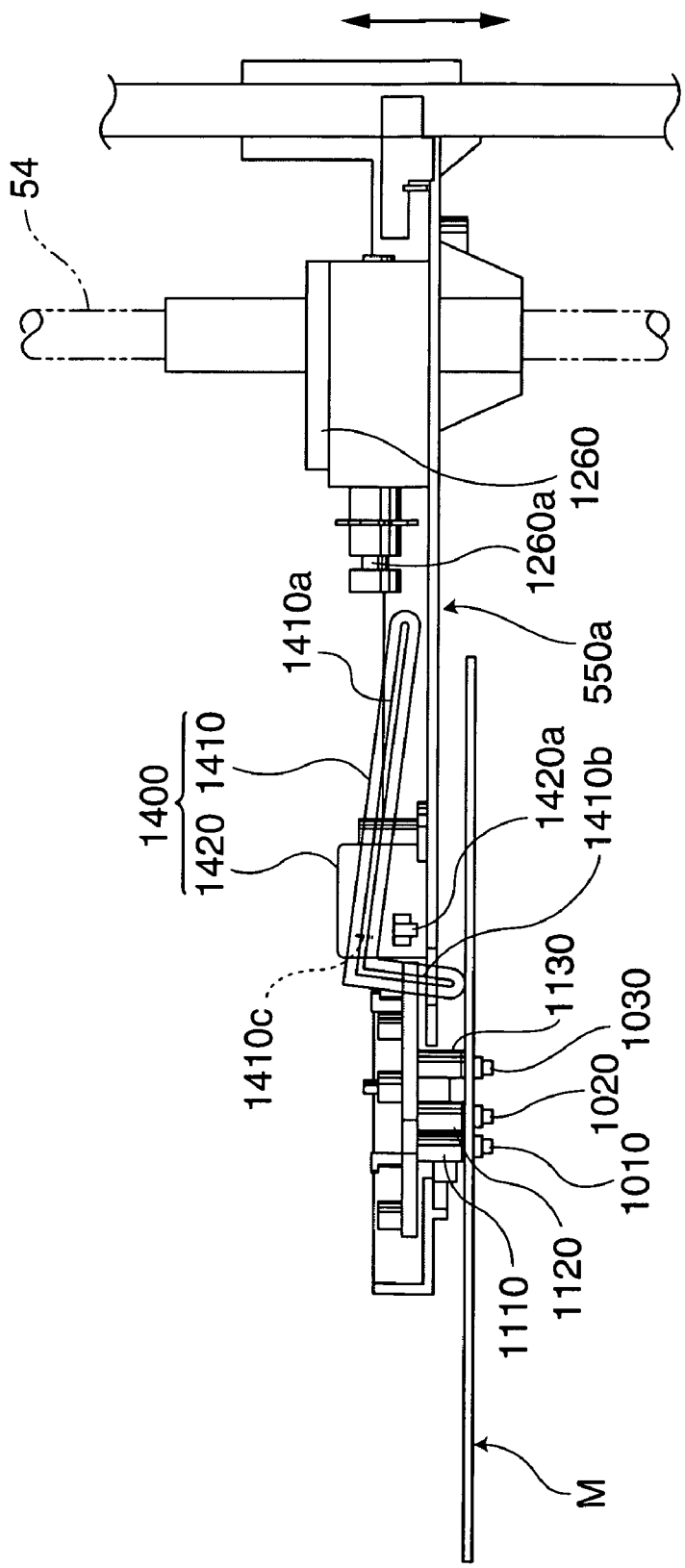
FIG. 13 is a side view showing the gripping mechanism of the transportation arm of the media transportation unit.

As shown in FIG. 12, the gripping mechanism 1000 for picking media has a media detection mechanism for controlling the stopping position (insertion distance) of the gripping claws 1010, 1020, and 1030 when inserted to the center hole 200c of the media M. Referring to FIG. 12 and FIG. 13, the media detection mechanism 1400 according to this embodiment of the invention has a media detection lever 1410 and a media detector 1420, which is a photocoupler.

The media detection lever 1410 is an L-shaped lever including a straight base leg 1410a and a distal end part 1410b that bends perpendicularly downward from the distal end of the base leg 1410a. The media detection lever 1410 is mounted so that the rear end part of the base leg 1410a can pivot vertically to the top surface of the arm base 550a. The base leg 1410a of the media detection lever 1410 rides on the top of the arm base 550a, and the distal end part 1410b protrudes below the back of the arm base 550a through an opening 550d in the arm base 550a. A detection plate 1410c projecting to the side is formed on the side of the base leg 1410a. A detection range 1420a for the media detector 1420 is located along the path of detection plate 1410c movement when the media detection lever 1410 moves vertically.

When medium M is not held, the media detection lever 1410 is horizontal and resting on the arm base 550a. The detection plate 1410c is positioned in the detection range 1420a of the media detector 1420 at this time, thus blocking the detection beam that passes through the detection range 1420a and the media detector 1420 is off. When the media transportation arm 55 descends and the gripping claws 1010, 1020, 1030 are inserted to the center hole 200c in the disc M, the distal end part 1410b of the media detection lever 1410 contacts the surface of the media M and pushes the media detection lever 1410 up as the media transportation arm 55 descends.

As shown in FIG. 13, when the gripping claws 1010, 1020, 1030 are fully inserted to the center hole 200c of the media M and just before the bottom ends 1110a, 1120a, 1130a of their supporting support pins 1110, 1120, 1130 contact the surface of the medium M, the detection plate 1410c leaves the detection range 1420a and the media detector 1420 turns on. Insertion of the gripping claws 1010, 1020, 1030 to the center hole 200c of the disc M is thus detected.

The height of the media in the media stacker can thus be measured by lowering the media transportation arm 55 so that the distal end part 1410b of the media detection lever 1410 attached to the media transportation arm 55 moves to the media stacker and contacts the media in the media stacker.

The gripping mechanism 1000 has three tubular gripping claws 1010, 1020, 1030 disposed in a circle at equal angle intervals, and these gripping claws 1010, 1020, 1030 extend vertically downward from a round hole 550c formed in the distal end of the arm base 550a. The media M can be picked by inserting these three gripping claws 1010, 1020, 1030 into the center hole 200c in the media M and then pushing the claws radially to the outside.

The gripping claws 1010, 1020, 1030 are disposed on the bottom ends of larger diameter support pins 1110, 1120, 1130. The support pins 1110, 1120, 1130 pass through to the top side of the round hole 550c in the arm base 550a, and are affixed respectively to three pivot arms 1210, 1220, 1230 disposed on the top of the arm base 550a. Pivot pins 1310, 1320, 1330 are fixed perpendicularly to the arm base 550a at equal angle intervals in a circle around the round hole 550c. The pivot arms 1210, 1220, 1230 are supported to pivot on these pivot pins 1310, 1320, 1330.

The pivot arms 1210, 1220, 1230 have front and back arm parts 1210a, 1210b, 1220a, 1220b, 1230a, 1230b extending substantially circumferentially to the round hole 550c, and a support arm 1210c, 1220c, 1230c extending from the pivot axis to the inside of the round hole 550c. The support pins 1110, 1120, 1130 are fixed vertically to the back distal end part of the support arms 1210c, 1220c, 1230c.

This gripping mechanism 1000 has the following mechanism for causing the pivot arms 1210, 1220, 1230 to pivot.

An operating arm 1210d extending in the opposite direction as the support arm 1210c is disposed to the pivot arm 1210. The distal end of one arm part 1250a of an L-shaped link 1250 is connected freely rotatably to the distal end part of the operating arm 1210d. The L-shaped link 1250 can pivot at the bend in the L, and the distal end part of the opposite arm part 1250b is linked to the operating rod 1260a of an actuator solenoid 1260. When the solenoid 1260 is off, the operating rod 1260a is extended. When the solenoid 1260 turns on, the operating rod 1260a is pulled back in resistance to the force of an internal spring, causing the L-shaped link 1250 to pivot.

When the media transportation arm 55 picks media M, the media detection lever 1410 is on, and when the media M is released, the media detection lever 1410 turns off.

Although the present invention has been described in connection with the preferred embodiments thereof with reference to the accompanying drawings, it is to be noted that various changes and modifications will be apparent to those skilled in the art. Such changes and modifications are to be understood as included within the scope of the present invention as defined by the appended claims.

What is claimed is:

1. A media processing device comprising:
   a data writing means that applies a data writing process to one side of a target medium;
   a printing means that applies a printing process to the other side of the target medium;
   a blank media storage means for storing blank media, which is the target media to which the data writing process and the printing process have not been applied;
   a processed media storage means for storing processed media, which is the target media after the data writing process and the printing process have been applied;
   a media transportation mechanism control unit that controls a media transportation mechanism to transport the target medium to any one of the data writing means, the printing means, the blank media storage means, and the processed media storage means; and
   a measurement control unit that instructs the media transportation mechanism control unit to measure a height of the blank media received by the blank media storage means and a height of the processed media received by the processed media storage means based on a height measuring command;
   wherein the measurement control unit moves the media transportation mechanism to a top of the blank media storage means and then measures a height of one or more blank media received by the blank media storage means based on at least a transportation mechanism movement command and a height measurement command received between a start process command and end process command received from a host computer; and
   wherein the measurement control unit moves the media transportation mechanism to a top of the processed media storage means and then measures a height of one or more processed media received by the processed media storage means based on at least a transportation mechanism movement command and a height measurement command received between the start process command and the end process command received from the host computer.

2. The media processing device described in claim 1, wherein:
   the measurement control unit determines if the height measurement command executed normally; and
   the transmission control unit sends an error report to the host computer if the measurement control unit determines the height measurement command did not execute normally.

3. A media processing device comprising:
   a media drive that applies a data writing process to one side of a target medium;
   a printer that applies a printing process to the other side of the target medium;
   a blank media stacker for storing blank media, which is the target media to which the data writing process and the printing process have not been applied;
   a processed media stacker for storing processed media, which is the target media to which the data writing process and the printing process have been applied;
   a media transportation mechanism control unit that controls a media transportation mechanism to transport the target medium to any one of the media drive, the printer, and the target media stacker; and
   a measurement control unit that instructs the media transportation mechanism control unit to measure a height of the blank media received by the blank media stacker and a height of the processed media received by the processed media stacker based on a height measurement command;
   wherein the measurement control unit moves the media transportation mechanism to a top of the blank media stacker and then measures a height of one or more blank media received by the blank media stacker based on at least a transportation mechanism movement command and a height measurement command received between a start process command and end process command received from a host computer; and
   wherein the measurement control unit moves the media transportation mechanism to a top of the processed media stacker and then measures a height of one or more processed media received by the processed media stacker based on at least a transportation mechanism movement command and a height measurement command received between the start process command and the end process command received from the host computer.

4. The media processing device described in claim 3, wherein:
   the measurement control unit determines if the height measurement command executed normally; and
   the transmission control unit sends an error report to the host computer if the measurement control unit determines the height measurement command did not execute normally.

5. A control method for a media processing device that has a media drive that applies a data writing process to one side of a target medium, a printer that applies a printing process to the other side of the target medium, a blank media stacker for storing blank media, which is the target media to which the data writing process and the printing process have not been applied, a processed media stacker for storing processed media, which is the target media to which the data writing process and the printing process have been applied, and a media transportation mechanism control unit that controls a media transportation mechanism to transport the target medium to any one of the data writing means, the printer, and the target media stacker, the control method comprising:

measuring the height of the blank media received by the blank media stacker and the processed media received by the processed media stacker based on media transportation mechanism operation according to a height measurement command for moving the media transportation mechanism and measuring the height of the blank media and the processed media at the respective destinations;

moving the media transportation mechanism to the top of the blank media stacker and then measuring the height of one or more blank media received by the blank media stacker based on at least one transportation mechanism movement command and height measurement command received between a start process command and end process command received from a host computer; and moving the media transportation mechanism to the top of the processed media stacker and then measuring the height of one or more processed media received by the processed media stacker based on at least one transportation mechanism movement command and height measurement command received between the start process command and the end process command received from the host computer.

6. The media processing device control method described in claim 5, further comprising:

determining if the height measurement command executed normally; and sending an error report to the host computer if the determining step determines the height measurement command did not execute normally.

7. The media processing device control method described in claim 5, further comprising:

determining if the height measurement command executed normally;

storing the measurement acquired in the height measurement step if the determining step determines the height measurement command executed normally; and sending the measurement stored in the storage step to the host computer in response to a measurement transmission request from the host computer.

8. The media processing device described in claim 1, wherein the host computer calculates the number of discs in the blank media stacker and the processed media stacker to enable a user to add discs to said blank media stacker and remove discs from said processed media stacker.

9. The media processing device described in claim 5, further including:

calculating the number of discs in the blank media stacker and the processed media stacker to enable a user to add discs to said blank media stacker and remove discs from said processed media stacker.

\* \* \* \* \*